US008711715B2

(12) United States Patent
Wu et al.

(10) Patent No.: US 8,711,715 B2
(45) Date of Patent: *Apr. 29, 2014

(54) METHOD AND APPARATUS TO SELECT A PROFILE OF A DIGITAL COMMUNICATION LINE

(75) Inventors: Xidong Wu, Livermore, CA (US); Ganesh Krishnamurthi, Danville, CA (US); Amit J. Rele, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 361 days.

This patent is subject to a terminal disclaimer.

(21) Appl. No.: 12/637,728

(22) Filed: Dec. 14, 2009

(65) Prior Publication Data

US 2010/0091889 A1  Apr. 15, 2010

Related U.S. Application Data

(63) Continuation of application No. 10/764,816, filed on Jan. 26, 2004, now Pat. No. 7,656,814.

(51) Int. Cl.
*H04J 1/16* (2006.01)
*H04L 12/28* (2006.01)

(52) U.S. Cl.
CPC .................. *H04L 12/2856* (2013.01)
USPC ........................ 370/252; 379/32.04

(58) Field of Classification Search
USPC .......... 370/216, 232, 241–252; 375/224, 225; 379/1.01, 1.03, 1.04
See application file for complete search history.

(56) References Cited

U.S. PATENT DOCUMENTS

| 5,781,598 | A | 7/1998 | Hardy, III |
| 5,838,671 | A | 11/1998 | Ishikawa et al. |
| RE36,862 | E | 9/2000 | Gupta et al. |
| 6,130,882 | A | 10/2000 | Levin |
| 6,175,832 | B1 | 1/2001 | Luzzi et al. |
| 6,178,448 | B1 | 1/2001 | Gray |
| 6,219,378 | B1 | 4/2001 | Wu |
| 6,263,048 | B1 | 7/2001 | Nelson et al. |
| 6,445,773 | B1 | 9/2002 | Liang et al. |
| 6,453,014 | B1 * | 9/2002 | Jacobson et al. ........... 379/26.01 |
| 6,498,808 | B1 | 12/2002 | Tzannes |
| 6,636,505 | B1 | 10/2003 | Wang et al. |
| 6,647,058 | B1 | 11/2003 | Bremer et al. |

(Continued)

OTHER PUBLICATIONS

International Search Report for International Patent No. PCT/US04/39622, mailed on Oct. 31, 2006.

(Continued)

*Primary Examiner* — Kan Yuen
(74) *Attorney, Agent, or Firm* — Toler Law Group, PC

(57) ABSTRACT

A method of selecting a profile of a digital communication line includes determining a first throughput value of the digital communication line, the first throughput value associated with a first profile and determined based at least in part on a count of code violations. The method includes determining a second throughput value of the digital communication line that is associated with a second profile, the second throughput value determined based on the count of code violations. The method includes identifying a selected profile that has a greater corresponding throughput value. The first throughput value is greater than the second throughput value when the count of code violations is less than a threshold and the first throughput value is smaller than the second throughput value when the count of code violations is greater than the threshold.

19 Claims, 6 Drawing Sheets

(56) References Cited

U.S. PATENT DOCUMENTS

| | | | |
|---|---|---|---|
| 6,678,245 B1 | 1/2004 | Cooper et al. | |
| 6,782,078 B1 | 8/2004 | Posthuma | |
| 6,798,769 B1 | 9/2004 | Farmwald | |
| 6,816,469 B1 | 11/2004 | Kung et al. | |
| 6,865,232 B1 | 3/2005 | Isaksson et al. | |
| 6,904,054 B1 | 6/2005 | Baum et al. | |
| 6,963,541 B1 | 11/2005 | Vogel | |
| 6,985,444 B1 | 1/2006 | Rosen | |
| 7,218,645 B2 | 5/2007 | Lotter et al. | |
| 7,295,570 B1 | 11/2007 | Arnold et al. | |
| 7,809,116 B2 * | 10/2010 | Rhee et al. | 379/1.04 |
| 2002/0021708 A1 * | 2/2002 | Ishiai | 370/420 |
| 2002/0080886 A1 | 6/2002 | Ptasinski et al. | |
| 2002/0098799 A1 | 7/2002 | Struhsaker et al. | |
| 2002/0168054 A1 | 11/2002 | Klos et al. | |
| 2003/0007455 A1 | 1/2003 | Kohzuki et al. | |
| 2003/0033262 A1 | 2/2003 | Aoki | |
| 2003/0095591 A1 | 5/2003 | Rekai et al. | |
| 2003/0189977 A1 | 10/2003 | Sweitzer et al. | |
| 2003/0218984 A1 | 11/2003 | Tanaka | |
| 2004/0136329 A1 | 7/2004 | Duvaut et al. | |
| 2004/0193974 A1 | 9/2004 | Quan et al. | |
| 2005/0068891 A1 | 3/2005 | Arsikere et al. | |
| 2005/0138524 A1 * | 6/2005 | Cioffi | 714/758 |
| 2005/0172030 A1 | 8/2005 | Fay | |
| 2006/0114833 A1 | 6/2006 | Castellano et al. | |
| 2006/0153174 A1 | 7/2006 | Towns-von Stauber | |
| 2007/0254644 A1 | 11/2007 | Dobson | |
| 2011/0051906 A1 * | 3/2011 | Cioffi et al. | 379/32.04 |

OTHER PUBLICATIONS

International Search Report for International Patent No. PCT/US06/04386, mailed on Aug. 8, 2007.

* cited by examiner

METHOD AND APPARATUS TO SELECT A PROFILE OF A DIGITAL COMMUNICATION LINE

CLAIM OF PRIORITY

The present application claims priority from and is a continuation of U.S. patent application Ser. No. 10/764,816 filed on Jan. 26, 2004 and entitled "Method of Selecting a Profile of a Digital Subscriber Line," the contents of which are expressly incorporated herein by reference in their entirety.

BACKGROUND

The traditional process for making asynchronous digital subscriber line (ADSL) performance adjustments is based on measurements of line performance parameters, such as signal noise margin and relative capacity. These line performance parameters do not directly measure the actual data transfer rate provided by an ADSL connection. Further, line performance adjustments are typically made using a manual process that depends on a particular technician's preferences, experience, and judgment. This manual process often leads to inaccurate performance adjustments and is typically error-prone. Even after an ADSL line has been adjusted, the actual data transfer performance of the ADSL line may be better, the same, or may be worse since the customer experience and data transfer rates are not directly measured or calculated during the adjustment process.

DETAILED DESCRIPTION

Figure 1:
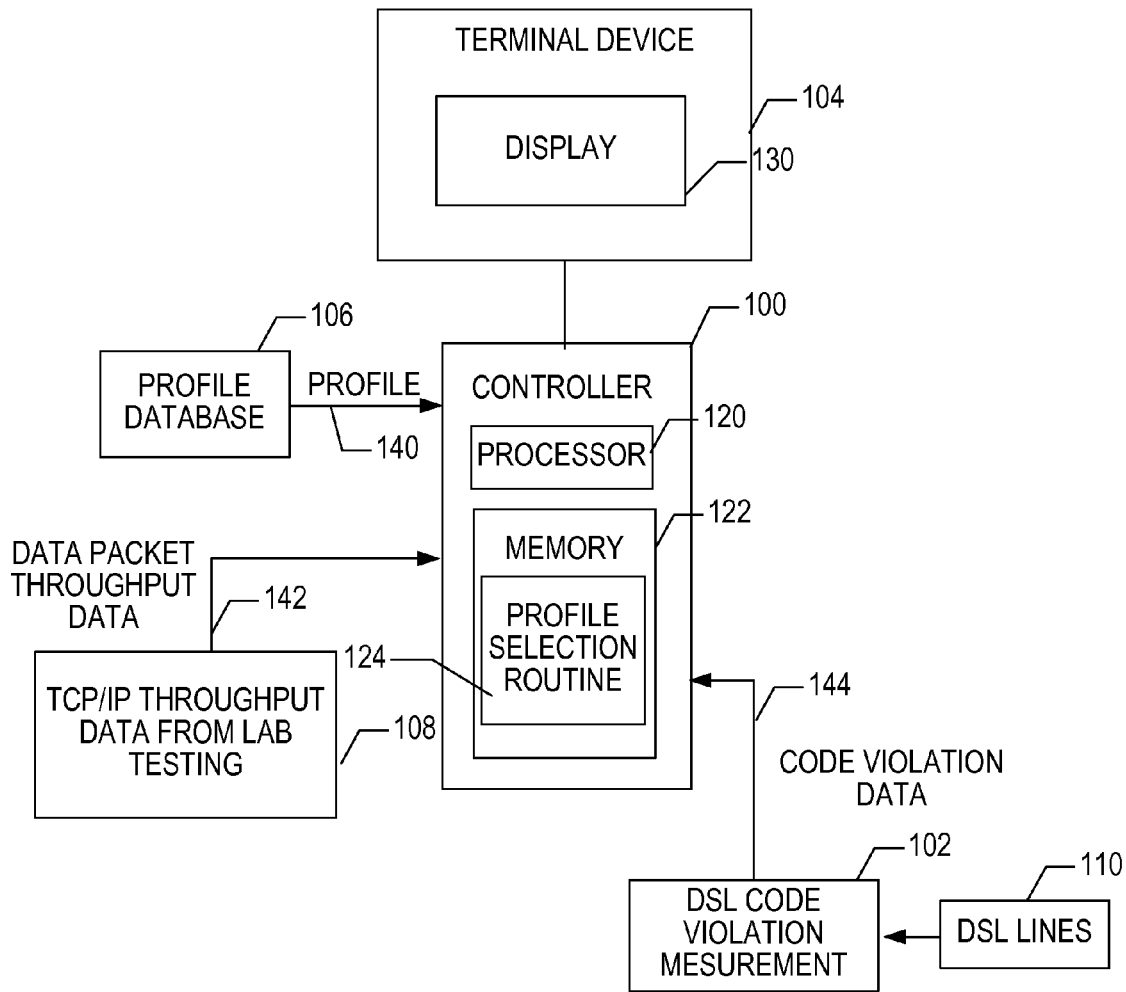
FIG. 1 is a block diagram that illustrates a DSL control system.

The disclosure presents an ADSL line performance adjustment method and system that measures and responds to profile performance parameters such as code violations, signal noise margin and relative capacity.

An ADSL user's experience is determined by the level of TCP/IP data packet throughput the user receives. When an ADSL line's condition degrades due to lowered signal noise margin (SNM), increased impulse noise, increased interference, or other adverse conditions, the line may experience dramatic increases of code violations, which means data integrity has been violated. The code violations, if unable to be corrected by the forward error correction (FEC) of the ADSL coding algorithm, result in TCP/IP packet re-transmission. The TCP/IP re-transmissions in turn lowers overall TCP/IP throughput.

If an ADSL line experiences a high degree of code violations, it might need to be moved to a lower speed profile that is more resistant to noise, or moved to an interleaved channel profile (if it is currently running at a fast channel profile) where the interleaving provides superior error correction ability. The line's code violation count can be greatly reduced with an appropriate new line profile. But, a lower speed profile or interleaved channel profile results in lower line speed. (In the case of interleaved channel profiles, lowered speed is the result of the delay that comes from frame scrambling and buffering). Therefore, whether or not a troubled line needs a new profile and which new profile should be selected depends on the line profile that can achieve higher TCP/IP throughput (current profile with higher line speed and higher code violations or lower speed profile or an interleaved channel profile with lower code violations).

The present disclosure provides a method that can be used to determine when a digital communication line should be moved to a different profile in order to increase its TCP/IP throughput. The disclosed system and method is useful for typical user web browsing, since the throughput of various TCP/IP applications is affected differently by code violations.

In a particular embodiment, a method of selecting a profile of a digital subscriber line is disclosed and includes determining a first throughput value of the digital subscriber line, the first throughput value associated with a first profile and determined based at least in part on a count of code violations. The first profile includes a first transmission speed associated with the digital subscriber line. The method includes determining a second throughput value of the digital subscriber line, the second throughput value associated with a second profile and based at least in part based on the count of code violations. The second profile includes a second transmission speed associated with the digital subscriber line. The method includes identifying, from the first profile and the second profile, a selected profile that has a greater corresponding throughput value. The first throughput value is greater than the second throughput value when the count of code violations is less than a threshold. The first throughput value is smaller than the second throughput value when the count of code violations is greater than the threshold.

In another particular embodiment, a digital subscriber line control system includes a controller including a processor, the controller operative to determine a selected profile from a first profile and a second profile, each profile having a corresponding throughput value. The selected profile has the corresponding throughput value that is a greater of a first throughput value associated with the first profile and a second throughput value associated with the second profile. The first throughput value is greater than the second throughput value when a count of code violations is smaller than a threshold and the first throughput value is smaller than the second throughput value when the count of code violations is greater than the threshold.

In another particular embodiment, a computer-readable medium stores processor-executable instructions that, when executed, cause the processor to determine a first throughput value of a digital communication line. The first throughput value is associated with a first profile and is based at least in part on a count of code violations. The first profile includes a first transmission speed associated with the digital communication line. The processor-executable instructions further cause the processor to determine a second throughput value of the digital communication line. The second throughput value is associated with a second profile and is determined at least in part based on the count of code violations. The second profile includes a second transmission speed associated with the digital communication line. The processor-executable instructions include instructions to identify, from the first profile and the second profile, a selected profile that has a greater corresponding throughput value. The first throughput value is greater than the second throughput value when the count of code violations is less than a threshold and the first throughput value is less than the second throughput value when the count of code violations is greater than the threshold.

Referring to FIG. 1, a system that may be used to select profiles and to adjust digital subscriber line performance is shown. The system includes a controller 100, a DSL code violation measurement unit 102, a profile database 106, and a data packet throughput storage module 108. The controller 100 is also coupled, either directly or remotely, to a terminal device 104 that includes a display 130. The DSL code violation measurement unit 102 is responsive to and takes measurements of DSL lines 110. The controller 100 includes a processor 120 and a memory 122. The memory includes a profile selection software routine that may be executed by the processor 120. The controller 100 is coupled to the profile database 106, the data packet throughput measurement unit 108, and the DSL code violation measurement unit 102. The controller 100 receives DSL profiles 140 from the profile database 106, and receives data packet throughput data 142 from the data packet throughput data unit 108. The controller 100 receives code violation data 144 from the DSL code violation measurement unit 102. The controller 100 provides reports, including graphical displays and charts, on the display 130 of the terminal device 104. In a particular embodiment, the terminal device 104 is a remote device that includes a web browser interface and is coupled to the controller via a distributed data network.

Figure 2:
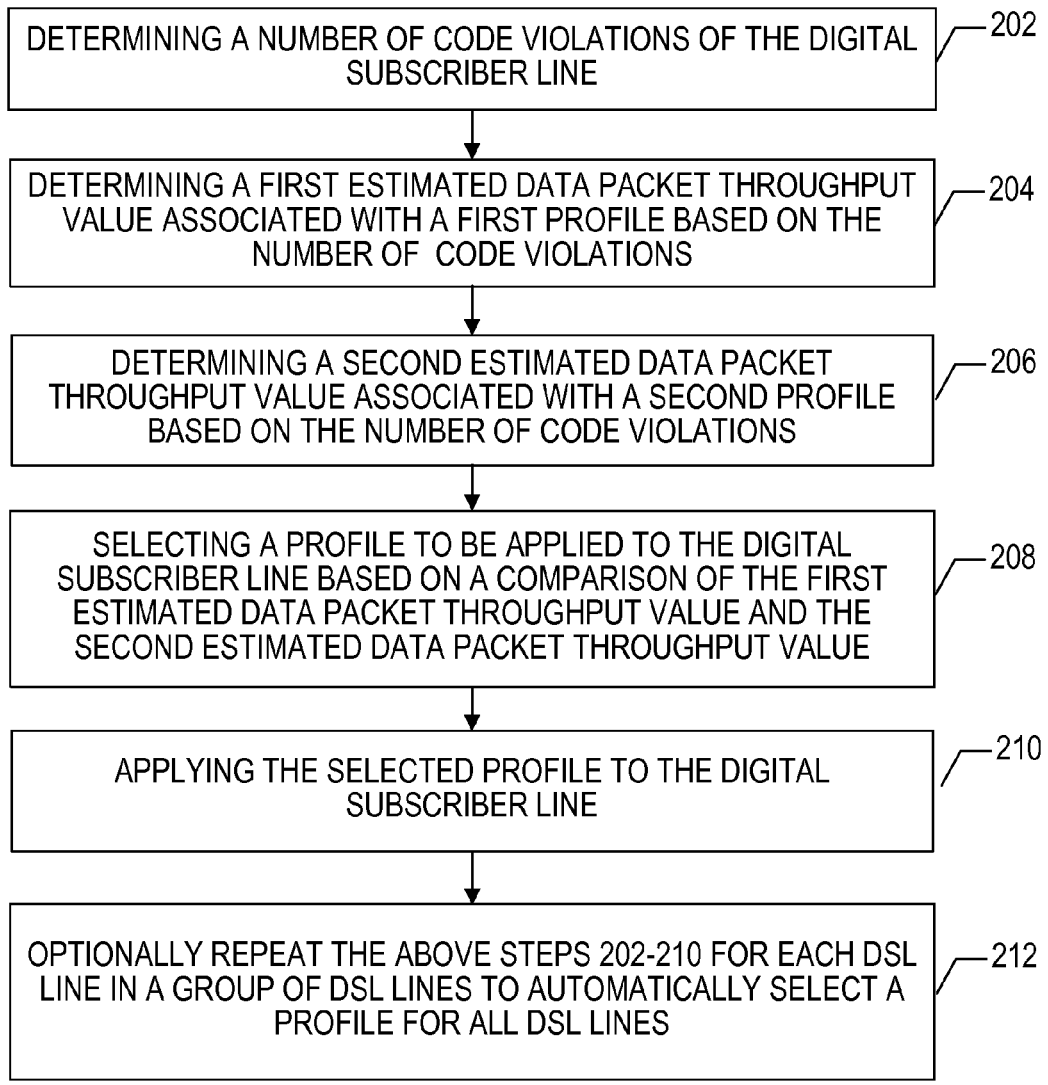
FIG. 2 is a flow chart that illustrates an embodiment of a method of selecting a profile of a DSL line.

Referring to FIG. 2, an illustrative method of selecting a profile to be applied to a DSL line is shown. At step 202, the method includes the step of determining a number of code violations of the digital subscriber line. A first estimated data packet throughput value associated with a first profile based on the number of code violations is determined, at 204, and a second estimated data packet throughput value associated with a second profile based on the number of code violations is determined, at step 206. A profile to be applied to the digital subscriber line is selected, at step 208. The profile selected is based on a comparison of the first estimated data packet throughput value and the second estimated data packet throughput value. For example, the profile that has the highest estimated data packet throughput value may be selected. An example of a data packet throughput value is a TCP/IP throughput value. After the profile is selected, the selected profile may be applied to the DSL line, at step 210.

As shown at step 212, the illustrated method steps 202-210 may optionally be repeated for a plurality of different DSL lines. In a sample network, there may a vast number of DSL lines, and a selected profile may be determined for each of the DSL lines. The above described method may be automatically performed using a computer system to determine a selected profile that provides the highest TCP/IP throughput value. The TCP/IP throughput value estimates are based on code violation counts and these estimates and estimate curves are determined based on laboratory test data. In this manner, an automated system and method has been described to provide for increased TCP/IP packet transfer performance over an entire network of DSL lines. An example of an automated system is to use the system of FIG. 1 where the profile selection routine 124 within the controller 100 is a computer program that performs the operational steps and computations illustrated in FIG. 2.

The TCP/IP packet transfer rate is useful since this data packet rate is tied to the performance experienced by the end customers. For example, the transfer rate provides the speed that a given website is displayed and downloaded onto an end DSL subscriber's computer while that subscriber is surfing the internet.

Figure 3:
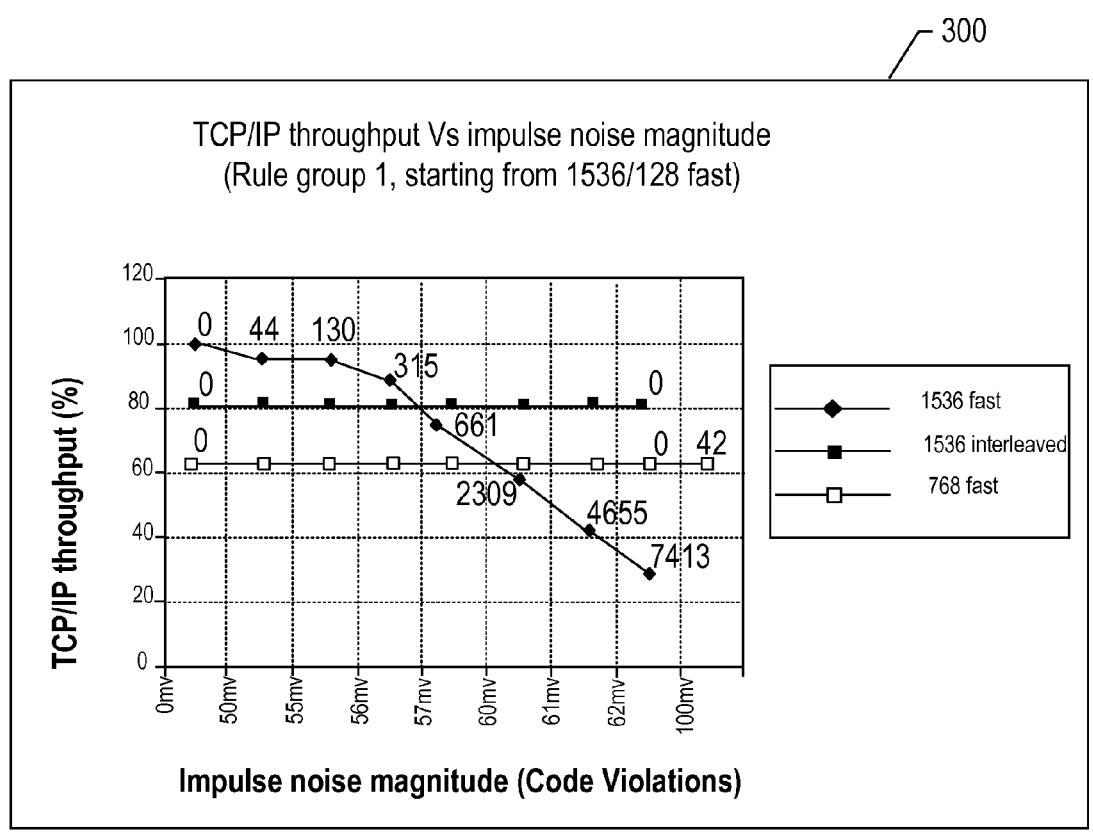
FIGS. 3-6 are general diagrams that illustrate graphical displays that may be provided to a user of the system of FIG. 1 in connection with DSL profile selection.

Referring to FIGS. 3-6, a plurality of graphical displays 300, 400, 500, and 600 are shown. Each of the graphical displays shows a graphical chart that may be provided on the display 130 of the terminal device 104. Each of the graphical displays include a first display curve for a first profile, a second display curve for a second profile, and a third display curve for a third display profile. Each display curve is formed from a plurality of TCP/IP throughput data points at a particular number of measured code violations for a particular DSL line. For example, the first display curve referenced in FIG. 3 is a fast speed profile at a transmission speed of 1536 kbits per second. The second profile referenced in FIG. 3 is an interleaved channel profile also at 1536 kbits per second. The third display curve is a fast speed profile at the reduced speed of 768 kbits per second. As the number of code violations increase, such as due to increased DSL line noise, the preferred profile changes from the first display curve to the second display curve at an intersection point between data points 315 and 661, at a noise level of about 58 millivolts, as shown in FIG. 3. The number of code violations corresponds to the magnitude of noise that is injected into a particular DSL line.

The first curve has a second intersection point with the third curve at a higher level of noise/code violations. As shown in FIG. 3, the second intersection point is between the data point at 661 and the data point of 2309 code violations, at about 60.4 millivolts of noise. Thus, for the particular example shown in FIG. 3, the disclosed profile selection method would select the first profile (with the first profile display curve) for code violation measured readings of 0, 44, 130, and 315 and would selected the second profile (with the second profile display curve) at the code violation reading of 661. The third profile would be selected for increased noise leading to code violations above the point of intersection between the 768 curve and the 1536 fast curve, at approximately 2000 code violations. The number of code violations shown is the count of detected code violations accumulated during a time period of fifteen minutes. Other time periods may be used such as intervals of 30 minutes or hourly. In addition to the fixed data points shown, the curves can be prorated and intersection points extrapolated to make profile selections. For example, for a DSL line with a fast (i.e. noninterleaved) speed of 1536 kbits per second (kb/s), when this line experiences more than about 450 code violations every 15 minutes, the line should be switched to the 1536 kbits per second interleaved profile.

Figure 4:
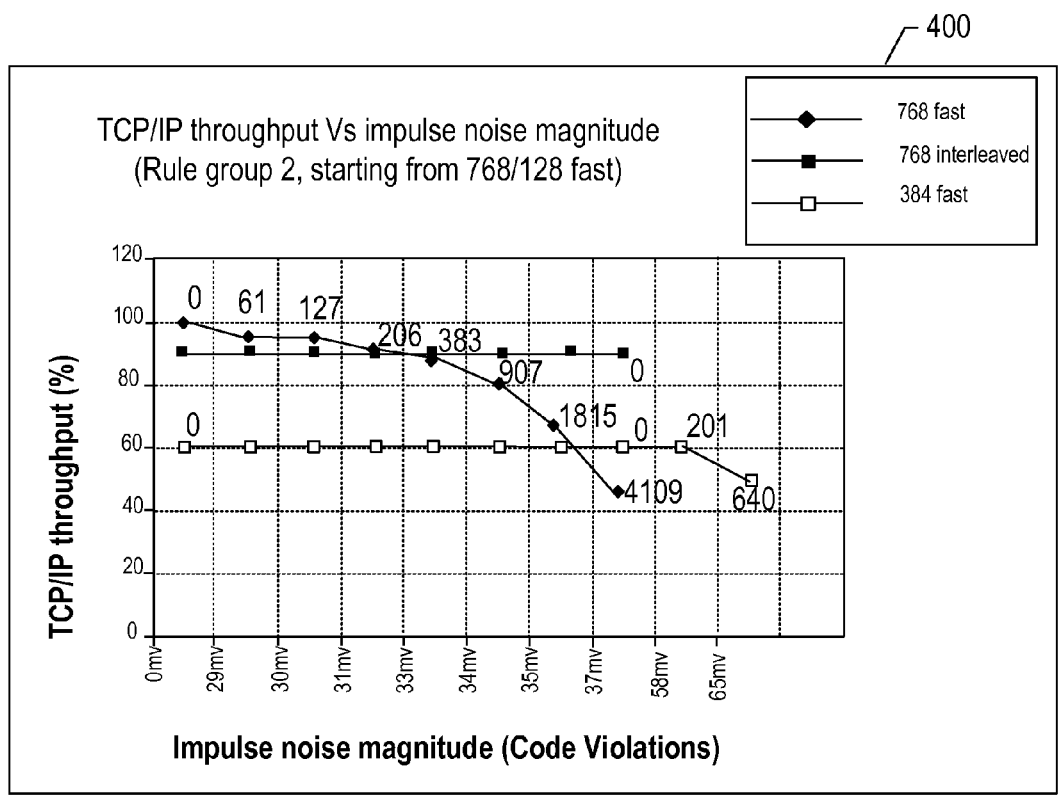
Figure 5:
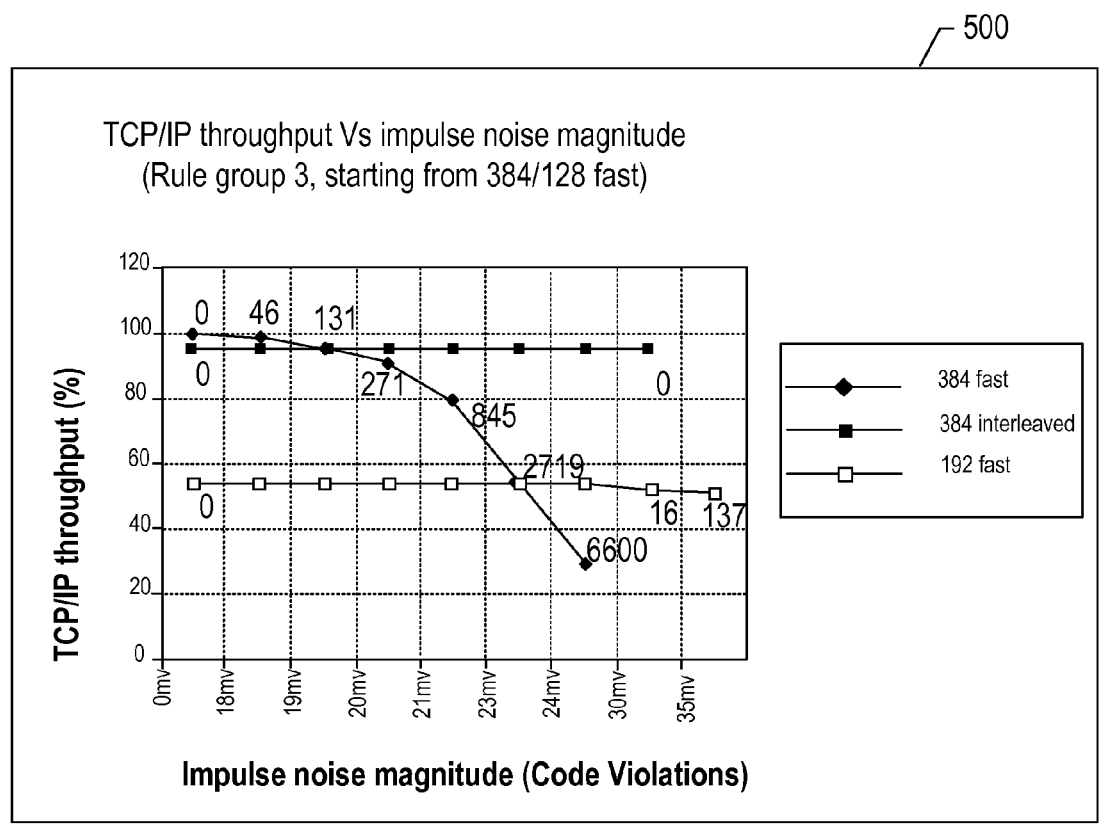
Figure 6:
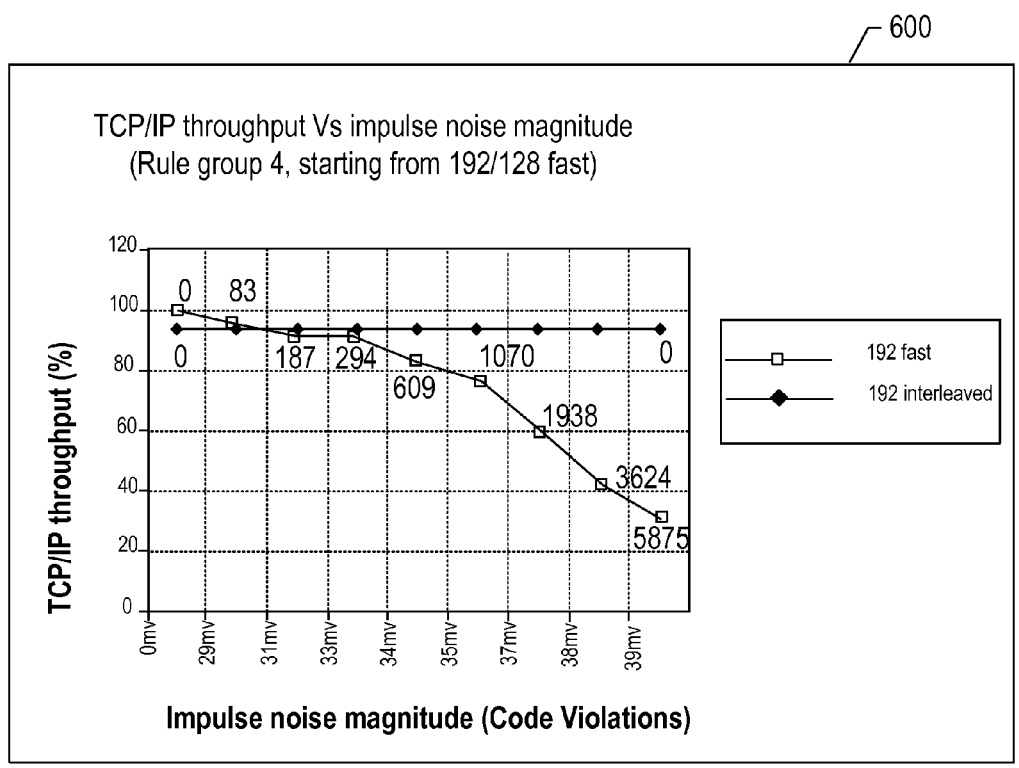

Referring to FIG. 4, a TCP/IP throughput vs. Code Violations for impulse noise graphical display is shown for a DSL line that starts with a 768 (kb/s) fast speed profile. This diagram shows profile selection transition points between the 768 kb/s interleaved profile and the 384 fast (i.e. non-interleaved) profile. FIG. 5 shows a similar chart for 384 kb/s and 192 kb/s profiles, and FIG. 6 shows a similar chart for a 192 kb/s and a 192 kb/s interleaved profile.

Unlike traditional ADSL optimization, which is based solely on line performance parameters such as code violations, signal noise margin and relative capacity, the method presented is based on both TCP/IP throughput and ADSL layer parameters. The method and system presented is based on experimental results of lab testing, while traditional ADSL optimization relies on individual service technicians' preferences.

The method and system disclosed produces clear criteria to determine when a line should be switched to another profile, and provides better TCP/IP throughput and therefore, better user experience. Since this method is based on TCP/IP throughput, ADSL users can determine how much faster they can download a file after switching to another profile.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   determining a count of code violations associated with a digital subscriber line; and
   selecting a particular profile of a plurality of profiles based on a comparison of the count of code violations to a threshold,
   wherein the plurality of profiles includes at least a first profile associated with a first transmission speed and a second profile associated with a second transmission speed,
   wherein the first profile is selected as the particular profile when the count of code violations is within a first range,
   wherein the second profile is selected when the count of code violations is within a second range that is different from the first range,
   wherein the first transmission speed is a non-interleaved transmission speed and the second transmission speed is an interleaved transmission speed,
   wherein a first throughput value associated with the first profile is higher than a second throughput value associated with the second profile when the count of code violations is within the first range, and
   wherein the first throughput value is lower than the second throughput value when the count of code violations is within the second range.

2. The method of claim 1, wherein the count of code violations is determined by counting data transmission anomalies associated with data transmitted over the digital subscriber line during a pre-determined time period.

3. The method of claim 2, wherein the data transmission anomalies include a signal to noise characteristic, an impulse noise characteristic, an interference characteristic, or a combination thereof.

4. The method of claim 1, wherein the first transmission speed is 1536 kbits per second, and wherein the second transmission speed is 768 kbits per second.

5. The method of claim 1, further comprising generating a graphical display that illustrates the first throughput value associated with the first profile, the second throughput value associated with the second profile, and the count of code violations.

6. The method of claim 5, wherein the graphical display illustrates a first set of data points for the first profile and a second set of data points for the second profile.

7. The method of claim 1, further comprising applying the selected particular profile to the digital subscriber line.

8. The method of claim 1, further comprising: determining the first throughput value of the digital subscriber line based on the count of code violations, wherein the first throughput value comprises a first data packet transmission control protocol/internet protocol throughput value; and determining the second throughput value of the digital subscriber line based on the count of code violations, wherein the second throughput value comprises a second data packet transmission control protocol/internet protocol throughput value, wherein the particular profile is selected based further on the first throughput value and the second throughput value.

9. The method of claim 1, wherein the count of code violations is determined by counting data transmission anomalies and wherein the data transmission anomalies include a bipolar violation, an excessive zeros error event, a frame synchronization bit error, or a combination thereof.

10. The method of claim 1, wherein the count of code violations is determined by counting data transmission anomalies and wherein the data transmission anomalies include at least two of a bipolar violation, an excessive zeros error event, a frame synchronization bit error, or a combination thereof.

11. The method of claim 1, wherein the first transmission speed is 1536 kbits per second, and wherein the second transmission speed is 1536 kbits per second.

12. A digital subscriber line control system comprising:
   a controller comprising a processor, the controller configured to:
   receive a count of code violations associated with a digital subscriber line; and
   select a particular profile of a plurality of profiles based on a comparison of the count of code violations to a threshold, wherein the plurality of profiles includes at least a first profile associated with a first transmission speed, and a second profile associated with a second transmission speed,
   wherein the first profile is selected as the particular profile when the count of code violations is within a first range,
   wherein the second profile is selected when the count of code violations is within a second range that is different from the first range,
   wherein the first transmission speed is a non-interleaved transmission speed and the second transmission speed is an interleaved transmission speed,
   wherein a first throughput value associated with the first profile is higher than a second throughput value associated with the second profile when the count of code violations is within the first range, and
   wherein the first throughput value is lower than the second throughput value when the count of code violations is within the second range.

13. The digital subscriber line control system of claim 12, further comprising a code violation measurement unit configured to: determine the count of code violations during a time period, wherein the count of code violations is determined by counting data transmission anomalies; and provide the count of code violations to the controller.

14. The digital subscriber line control system of claim 12, further comprising a profile database to store the plurality of profiles including the first profile and the second profile.

15. The digital subscriber line control system of claim 12, wherein the first profile associated with the first transmission speed is a non-interleaved profile and the second profile associated with the second transmission speed is an interleaved profile, and wherein the second transmission speed is the same as the first transmission speed.

16. The digital subscriber line control system of claim 12, wherein the first transmission speed is 1536 kbits per second and wherein the second transmission speed is 768 kbits per second.

17. The digital subscriber line control system of claim 12, further comprising a terminal device responsive to the controller, the terminal device configured to display a graphical report, the graphical report including a first profile curve illustrating code violation data for the first profile and a second profile curve illustrating code violation data for the second profile.

18. A computer-readable storage memory device including processor-executable instructions that, when executed, cause the processor to perform operations comprising:

determining a count of code violations associated with a digital subscriber line, wherein the count of code violations is determined by counting data transmission anomalies; and selecting a particular profile of a plurality of profiles based on a comparison of the count of code violations to a threshold, wherein the plurality of profiles includes at least a first profile associated with a first transmission speed, and a second profile associated with the first transmission speed, wherein the first profile is selected as the particular profile when the count of code violations is within a first range, wherein the second profile is selected when the count of code violations is within a second range that is different from the first range, wherein the first transmission speed is a non-interleaved transmission speed and the second transmission speed is an interleaved transmission speed, wherein a first throughput value associated with the first profile is higher than a second throughput value associated with the second profile when the count of code violations is within the first range, and wherein the first throughput value is lower than the second throughput value when the count of code violations is within the second range.

19. The computer-readable storage memory device of claim 18, wherein the operations further comprise applying the selected particular profile to the digital subscriber line.

* * * * *